(12) United States Patent
Knitl et al.

(10) Patent No.: US 11,274,024 B2
(45) Date of Patent: Mar. 15, 2022

(54) FILLING MEMBER WITH CHANGEOVER SYSTEM FROM FREE-FLOW TO SCREEN OUTLET

(71) Applicant: KRONES AG, Neutraubling (DE)

(72) Inventors: Thomas Knitl, Neutraubling (DE);
Juergen Soellner, Neutraubling (DE);
Sven Fischer, Neutraubling (DE)

(73) Assignee: KRONES AG, Neutraubling (DE)

(*) Notice: Subject to any disclaimer, the term of this patent is extended or adjusted under 35 U.S.C. 154(b) by 0 days.

(21) Appl. No.: 17/228,902

(22) Filed: Apr. 13, 2021

(65) Prior Publication Data

US 2021/0316977 A1  Oct. 14, 2021

(30) Foreign Application Priority Data

Apr. 14, 2020  (DE) .................... 10 2020 110 140.6

(51) Int. Cl.
| | | |
|---|---|---|
| *B67C 3/26* | (2006.01) | |
| *B01D 29/96* | (2006.01) | |
| *B01D 35/027* | (2006.01) | |
| *B01D 35/12* | (2006.01) | |
| *B67C 3/00* | (2006.01) | |
| *B67C 3/28* | (2006.01) | |

(52) U.S. Cl.
CPC ............... *B67C 3/26* (2013.01); *B01D 29/96* (2013.01); *B01D 35/027* (2013.01); *B01D 35/12* (2013.01); *B67C 3/004* (2013.01); *B67C 3/286* (2013.01)

(58) Field of Classification Search
CPC ......... B67C 3/26; B67C 3/2608; B67C 3/004; B01D 29/96; B01D 35/027

USPC ........... 141/87, 90–93, 144, 248; 222/189.06
See application file for complete search history.

(56) References Cited

U.S. PATENT DOCUMENTS

| | | | | |
|---|---|---|---|---|
| 3,642,213 A | * | 2/1972 | Parkison | ................. E03C 1/086 239/590 |
| 3,827,636 A | * | 8/1974 | Parkison | ................. E03C 1/084 239/428.5 |
| 3,857,424 A | * | 12/1974 | Roberts | ..................... B65B 3/32 141/275 |
| 4,410,108 A | * | 10/1983 | Minard | ................. B65B 39/001 141/261 |

(Continued)

FOREIGN PATENT DOCUMENTS

| | | |
|---|---|---|
| CH | 176895 | 5/1935 |
| DE | 10 2010 051450 | 5/2012 |

(Continued)

OTHER PUBLICATIONS

Extended European Search Report for corresponding European Patent Application No. 21 168 327.1 dated Sep. 3, 2021; 8 pages.

*Primary Examiner* — Timothy L Maust
(74) *Attorney, Agent, or Firm* — Haynes and Boone, LLP (57) ABSTRACT

A filling member for filling a container with a filling product, for example in a beverage filling system, includes a product outlet which is designed to dispense the filling product into a container located thereunder; and an equipment portion which as a first equipment means includes a screen device with a screen and which is designed to transfer the screen as required into a screen state, in which the screen is located between the product outlet and the container so that the filling product is filtered by the screen when introduced into the container, and out of the screen state.

20 Claims, 8 Drawing Sheets

(56) References Cited

U.S. PATENT DOCUMENTS

| | | | | |
|---|---|---|---|---|
| 4,730,786 | A * | 3/1988 | Nelson | F16K 47/08 239/590.3 |
| 4,911,067 | A | 3/1990 | Oppermann | |
| 5,094,278 | A * | 3/1992 | Arao | B65B 39/00 141/116 |
| 5,242,119 | A * | 9/1993 | Jariyasunant | E03C 1/08 239/590.3 |
| 5,472,144 | A * | 12/1995 | McDonald | B65B 39/00 239/533.14 |
| 5,865,221 | A * | 2/1999 | Ludwig | B67C 3/281 141/31 |
| 6,267,157 | B1 * | 7/2001 | Gruson | B05B 15/50 141/90 |
| 7,104,033 | B2 * | 9/2006 | Krulitsch | B67C 3/004 53/467 |
| 7,571,749 | B2 * | 8/2009 | Stocchi | B67C 3/004 141/105 |
| 7,594,616 | B2 * | 9/2009 | Hupp | B67D 1/0079 141/311 A |
| 7,743,798 | B2 * | 6/2010 | Kunii | B65B 3/22 141/90 |
| 8,312,901 | B2 * | 11/2012 | Goldbrunner | B67C 3/285 141/2 |
| 8,387,668 | B2 * | 3/2013 | Macquet | B67C 3/004 141/91 |
| 8,459,315 | B2 * | 6/2013 | Clusserath | B67C 3/004 141/90 |
| 8,505,594 | B2 * | 8/2013 | Krulitsch | B67C 3/2608 141/104 |
| 8,757,216 | B2 * | 6/2014 | Meinzinger | B67C 3/002 141/1 |
| 8,776,842 | B2 * | 7/2014 | Clusserath | B67C 3/004 141/91 |
| 8,844,585 | B2 * | 9/2014 | Laumer | B67C 3/001 141/91 |
| 2012/0174529 | A1 | 7/2012 | Clusserath | |
| 2015/0239722 | A1 * | 8/2015 | Clusserath | B67C 3/225 141/90 |

FOREIGN PATENT DOCUMENTS

| | | |
|---|---|---|
| EP | 0 919 472 A1 | 6/1999 |
| JP | 2007-290743 A | 11/2007 |
| JP | 2013-112355 A | 6/2013 |
| JP | 5222817 B2 | 6/2013 |

* cited by examiner

FILLING MEMBER WITH CHANGEOVER SYSTEM FROM FREE-FLOW TO SCREEN OUTLET

CROSS REFERENCE TO RELATED APPLICATIONS

This application claims priority from German Patent Application No. DE 10 2020 110 140.6, filed on Apr. 14, 2020 in the German Patent and Trademark Office, the disclosure of which is incorporated herein by reference in its entirety.

BACKGROUND

Technical Field

The present invention relates to a filling member for filling a container with a filling product, generally in a beverage filling system, for example for filling water, juice, soft drinks, smoothies, dairy products and the like.

Related Art

Filling members of various designs are known for the filling of filling products, in particular liquid or pasty filling products or filling products having a high viscosity. For example, for filling dairy products and juices frequently so-called free-flow filling systems are used, in which the filling product flows out of a filling product outlet of the filling member in free fall, i.e. not influenced by any guide devices, into the container to be filled. The flow rate of the filling product through such a free-flow filling system is generally controlled by a valve which comprises a valve cone which is located in a valve receiver of complementary shape to the valve cone. Thus the filling process is started by lifting the valve cone out of the valve receiver and the filling process is terminated again by subsequently lowering the valve cone onto the valve seat.

It is known to provide the filling valve with a screen in order to prevent foreign particles from passing into the container during the filling process. JP 5222817 B2 proposes relative thereto to install a screen in the lower region of an inner cylinder of the filling valve. In JP 2013-112355 A2 and JP 2007-290743 A2 the use of screen-like elements for modifying the liquid stream is known.

The screens from the aforementioned prior art are an integral component of the respective filling member. As in the case of JP 5222817 B2 the screens may be optionally removed and substituted, for example for the purpose of cleaning or replacement, but a combined operation of the filling member with or without a screen, depending on requirements, is not possible or not possible in a simple manner. Thus in order to operate the filling member with or alternatively without a screen, the filling operation has to be interrupted and the filling member partially dismantled by a mechanical/manual intervention.

SUMMARY

The present disclosure describes an improved filling member, and methods to improve the variability of the filling member, having at the same time a high level of quality and safety of the filling process.

The filling member according to the present disclosure serves for filling a container with a filling product. The filling member is particularly used in a beverage filling system, for example for filling water, juice, soft drinks, smoothies, dairy products and the like. The filling member is suitable for filling clear filling products such as water, dairy products and filling products of variable viscosity and/or mixed with additives, such as for example syrup, pulp, fruit pieces, fibres and the like.

The filling member comprises a product outlet which is designed to dispense the filling product into a container located thereunder. The term "thereunder" is to be understood in this case to mean in the direction of gravity. It is generally the case that when the filling member is used as intended, spatial relationships, such as "above", "below", "thereunder", etc. are unambiguously defined. The filling member further comprises an equipment portion which as a first equipment means comprises a screen device with a screen and which is designed to transfer the screen as required into a screen state, in which the screen is located between the product outlet and the container so that the filling product passes through the screen and is filtered thereby when introduced into the container, and out of the screen state. Depending on the filling product and/or the filling conditions, the screen may accordingly be introduced into the filling product stream or removed therefrom.

As a result, the filling member permits a particularly variable filling operation. Clear products, such as for example water, may be filled with the screen moved into the filling product stream, whereby any contamination of the filled product by foreign particles is prevented or at least reduced. The screen functions in this case as a final barrier for foreign particles. On the other hand, for example, viscous filling products or products with fibres and/or fruit pieces may be filled without a screen, whereby the filling member is able to be used in a highly flexible manner. The filling curve may be optionally adapted when the screen is moved in.

The screen also permits an improvement of the drip behaviour. The openings and/or mesh of the screen may be dimensioned and arranged such that uncontrolled dripping, for example of liquid which adheres to the lower region of a valve cone, is prevented or at least reduced.

For cleaning the screen in the moved-in or moved-out state, the screen may be acted upon from below by a cleaning jet from a corresponding nozzle and thus sprayed out from below.

In various embodiments, the screen device comprises a screen cup comprising the screen, wherein the equipment portion is designed to press the screen cup in the screen state against a housing portion of the filling member, such that the screen cup surrounds the product outlet in a fluid-tight manner in order to prevent the filling product from escaping past the screen and out of the product outlet. In this manner, a clean filling process is always achieved without the variability of the use of the filling member being limited, in particular without a partial dismantling of the filling member being required for an installation or removal of the screen.

In some embodiments, the movement of the screen device into and out of the screen state comprises a pivoting movement, whereby the variability set forth above may be implemented in a simple and reliable manner in terms of mechanical components. In this case, the screen device generally comprises a pivoting arm which is held on a pivoting shaft of the equipment portion and is pivotable thereby.

In certain embodiments, the movement of the screen device into and out of the screen state comprises a translational movement, particularly in an axial direction of the product outlet. In this manner, the corresponding equipment means may be pressed and/or pushed against the filling member in order to produce a reliable and optionally fluid-tight connection. The relative translational displacement between the filling member and the equipment means may be achieved in this case by the displacement of the filling member and/or the displacement of the equipment means.

In several embodiments, the filling member is designed for so-called free-flow filling. In this case, the filling member is designed such that the filling product exits from the product outlet and then, generally at atmospheric pressure, flows into the container to be filled in free fall, i.e. not influenced by any guide devices.

The filling product in this case may be set into a swirling motion by swirl bodies and/or a corresponding shaping of the product outlet, so that by the action of centrifugal force this filling product flows downwardly in a spiral movement on the container wall. Any gas, which is located in the container and which is displaced by the filling product during the filling process, may escape centrally through the container opening. In this manner, a uniform, smooth and uninterrupted filling process may be implemented with short filling times.

In some embodiments, the filling member comprises a product channel which is fluidically connected to the product outlet and a filling valve with a valve cone arranged in the product channel, a valve seat which is of complementary shape at least in some sections, and an actuator which is designed for the displacement of the valve cone in an axial direction of the product outlet so that the valve cone is able to be moved into the valve seat for blocking the product outlet and is able to be moved out of said valve seat for opening the product outlet. In this manner, a free-flow valve may be implemented in a simple and reliable manner in terms of mechanical components.

The filling valve may be designed as a check valve so that it is possible to switch in a binary manner between a closed and an open state. Alternatively the filling valve may be provided with a flow rate control so that in addition to the closed state a plurality of open states may be set with variable volumetric flow rates. The control of the filling valve may be carried out in this case in a discrete or continuous manner. The aforementioned flow rate control, for example, may be implemented by the valve cone having a cylindrical shape which tapers toward the product outlet. The product channel, which has the shape of an annular channel in the region of the valve cone, is formed on the inner face at least in some sections by the outer peripheral surface of the valve cone. On the outside, the annular gap is defined by the valve housing. According to this exemplary embodiment, the valve cone is designed to be displaceable in the axial direction, i.e. upwardly and downwardly. In this manner, the annular gap at the product outlet may be increased and reduced. The height adjustment of the valve cone is carried out within a working range, i.e. between a fully open position and a closed position, for example in a stepless manner.

In some embodiments, the equipment portion comprises in addition to the screen device at least one further equipment means. The equipment portion in this case is designed to transfer the further equipment means into a state below the product outlet and out of this state. In this manner, the equipment portion may be used synergistically for the flexible use of one or more further equipment means, whereby the variability of the filling member is further increased.

Thus at least one of the further equipment means may be a further screen device with a screen, the filter characteristics thereof differing from the screen of the first equipment means. For example, therefore, foreign particles of variable size may be filtered out of the filling product stream, depending on the filling product and/or field of use.

Particularly, at least one of the further equipment means is a CIP cup device having a CIP cup. The equipment portion in this case is designed to transfer the CIP, as required, generally for a cleaning and/or sterilizing operation, into a CIP state in which the CIP cup closes the product outlet, and out of the CIP state. In this manner, the equipment portion may be used synergistically for setting a screen state and a CIP state, whereby the variability of the filling member is further increased.

The term "CIP" in this case is understood to mean "cleaning in place", i.e. a cleaning method in which the filling member does not have to be dismantled for cleaning but may be flushed and/or steamed with a cleaning medium in the installed state. For the sake of linguistic simplicity, the term "CIP" also encompasses herein a so-called "sterilizing in place" (SIP), a sterilizing method in which the filling member in a similar manner does not have to be dismantled for sterilization but may be flushed through and/or steamed with a sterilizing medium in the installed state.

In various embodiments, the movement of the CIP cup device into and out of the CIP state comprises a pivoting movement, whereby the variability of the filling member may be implemented in a simple and reliable manner in terms of mechanical components. In this case, the CIP cup device typically has a pivoting arm which is held on a pivoting shaft of the equipment portion and is pivotable thereby.

The CIP cup may be designed to close the product outlet in a fluid-tight manner. Alternatively, the CIP cup may have an opening and/or may be provided with a drain in order to discharge the cleaning and/or sterilizing medium. The CIP cup may also be designed as a steam cup in order to permit a sterilization of product-guiding components by means of superheated steam or the like.

In some embodiments, the movement of the CIP cup device into and out of the screen state comprises a translational movement of the CIP cup, particularly in an axial direction of the product outlet. In this manner, the corresponding equipment means may be pressed against the filling member in order to produce a reliable and optionally fluid-tight connection. The relative translation displacement between the filling member and the equipment means may be achieved in this case by displacing the filling member and/or displacing the equipment means.

In certain embodiments, the equipment portion is designed to transfer the screen and the CIP cup into a screen/CIP state, in which both the screen and the CIP cup are located below the product outlet, and out of the screen/CIP state. This results in a combined use of both equipment means as a possible variant, so that different possibilities for the cleaning and/or sterilization of the filling member with or without a screen may be implemented.

In several embodiments, the screen device comprises a screen cup comprising the screen, wherein the equipment portion is designed such that in the screen/CIP state the screen cup is pressed against the valve housing whilst the CIP cup is pressed directly thereunder against the screen cup. In this manner, the two equipment means may be pressed against the filling member in order to produce a reliable and optionally fluid-tight connection.

In some embodiments, the screen is designed to be interchangeable. In this case the interchangeability or replaceability does not necessarily serve only for cleaning, maintenance or for replacement in the case of damage, but various filter characteristics may be implemented in this manner depending on the filling product and/or use. In this case, for example, the screen may be designed to be interchangeable as a small modular unit and/or the screen cup and/or the screen device as larger modular units. This also applies to any other equipment means, in particular the CIP cup device.

Alternatively, the screen may be configured in one piece with the screen device and, in particular, in one piece with a pivoting arm of the screen device. In this case, the screen may be particularly incorporated in the material of the screen device and/or the pivoting arm, and is particularly introduced into the material by means of a laser. In this manner, a stable and cost-effective screen device may be provided by the one-piece design.

Whilst, in the case of a plurality of equipment means, these equipment means are generally designed such that they are pivotable and/or movable independently of one another, a plurality of equipment means may also be attached to one and the same pivoting shaft. Thus, for example, a plurality of screen devices may be attached to a pivoting shaft, and alternatively or additionally a plurality of screen cups may be attached to the pivoting arm of the screen device so that these screen cups may be alternatively moved into the filling product stream below the product outlet. In this regard, the plurality of equipment means according to this embodiment form a type of "magazine" from which the suitable equipment means may be selected.

Further advantages and features of the present invention are apparent from the following description of exemplary embodiments. The features described therein may be implemented individually or in combination with one or more of the features set forth above, insofar as the features do no contradict one another. The following description of exemplary embodiments is made with reference to the accompanying drawings.

BRIEF DESCRIPTION OF THE FIGURES

Further embodiments of the invention are described in more detail by the following description of the figures.

DETAILED DESCRIPTION

Exemplary embodiments are described hereinafter with reference to the figures. In this case, elements which are identical, similar or functionally identical are provided in the various figures with identical reference numerals, and a repeated description of these elements is in some cases dispensed with in order to avoid redundancies.

Figure 1:
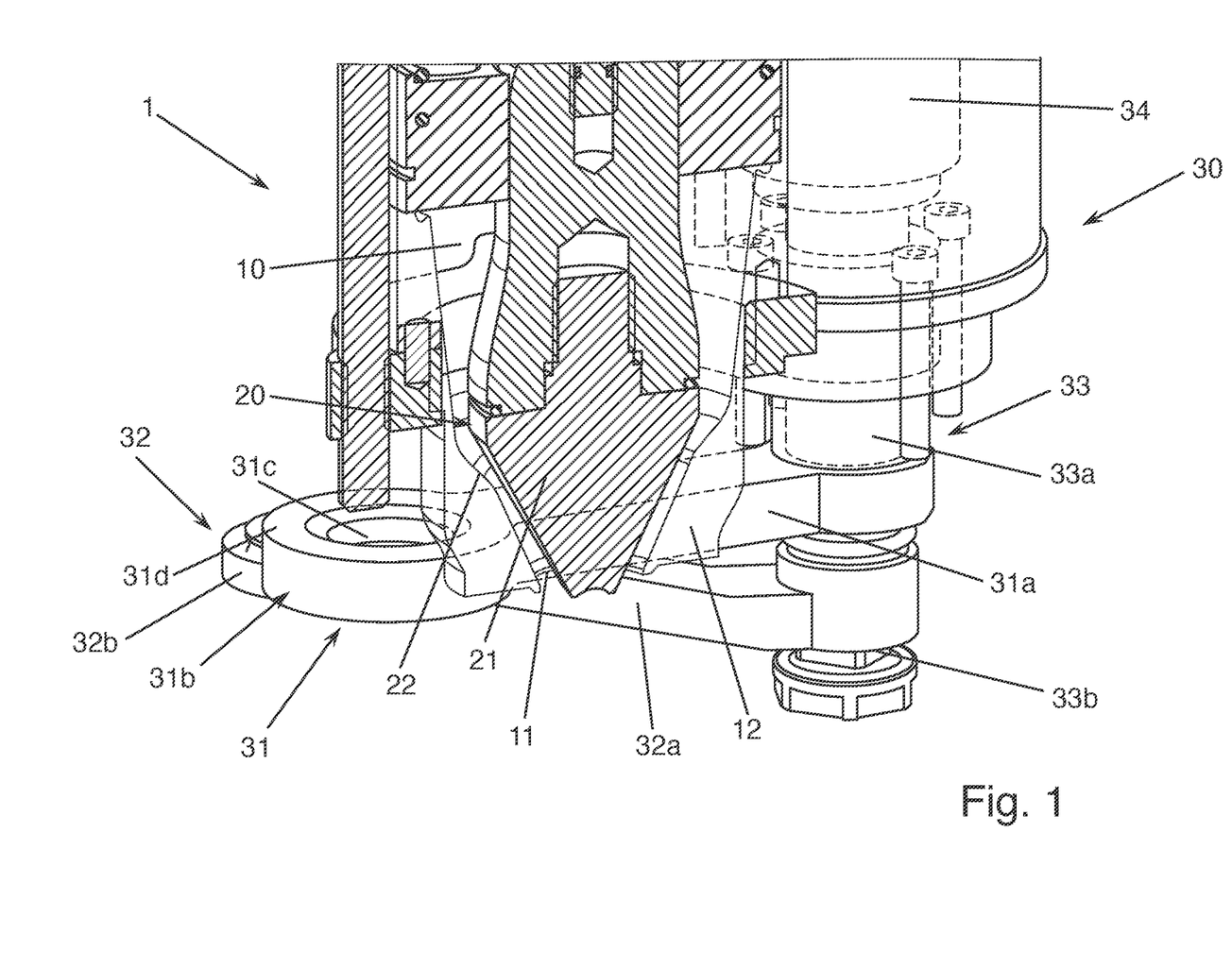
FIG. 1 shows a schematic three-dimensional partial view of a filling member according to an exemplary embodiment in the normal state.
Figure 2:
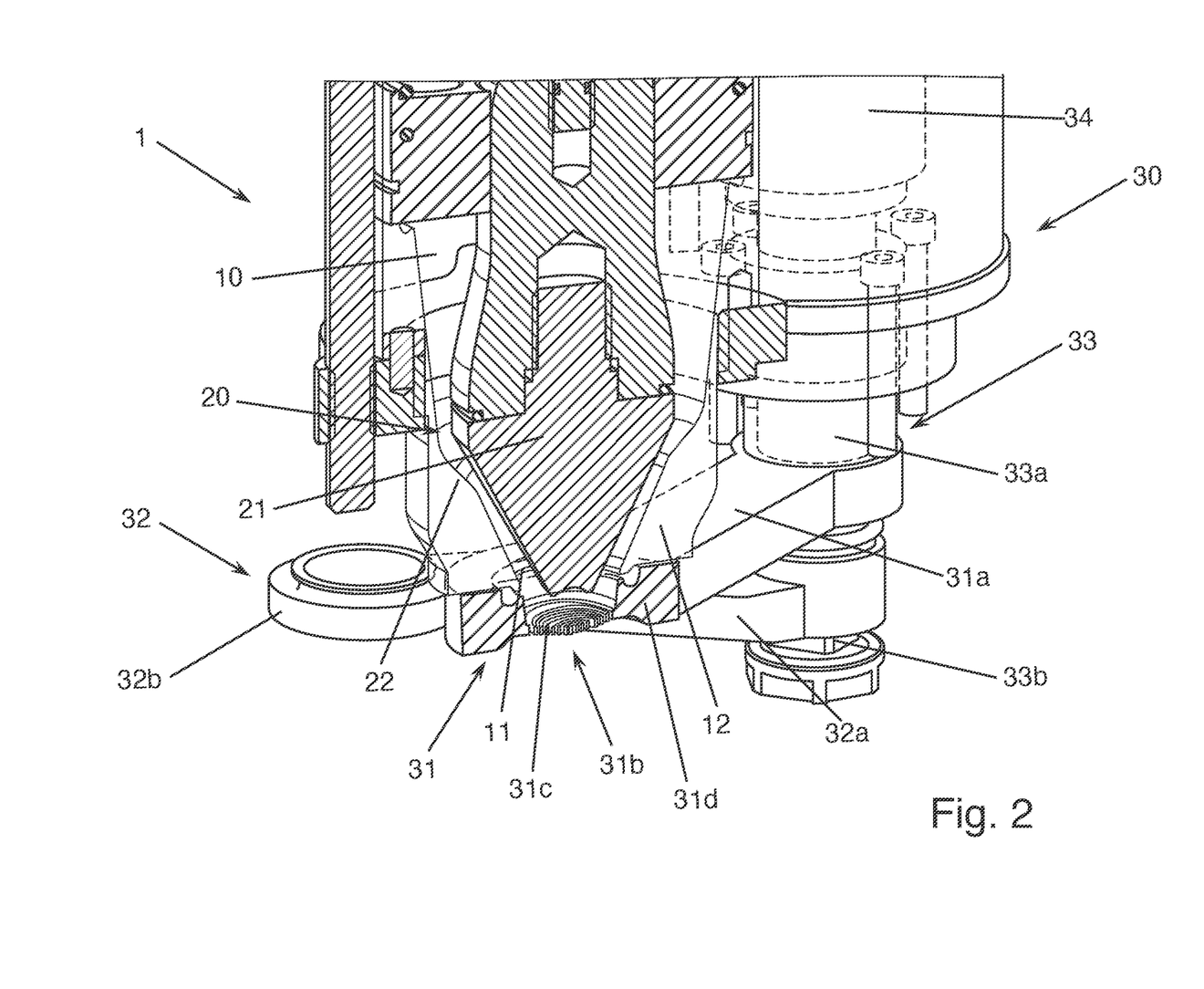
FIG. 2 shows a schematic three-dimensional partial view of a filling member according to the exemplary embodiment of FIG. 1 in the screen state.

FIGS. 1 and 2 are schematic three-dimensional partial views of a filling member 1 according to an exemplary embodiment, shown in two different states which are described in detail further below. Initially the basic construction of the filling member 1 is set forth:

The filling member 1 is designed herein for free-flow filling in which, generally at atmospheric pressure, the filling product flows in free fall, i.e. not influenced by any guide devices, into the container to be filled (not shown in the figures). The filling product in this case may be set into a swirling motion by swirl bodies and/or a corresponding shaping of a product outlet 11, so that by the action of centrifugal force this filling product flows downwardly in a spiral movement on the container wall. Any gas, which is located in the container and which is displaced by the filling product during the filling process, may escape centrally through the container opening. In this manner a uniform, smooth and uninterrupted filling process may be implemented with short filling times.

The filling member 1 is typically used in beverage filling systems, for example for filling water, juice, soft drinks, smoothies, dairy products and the like. The filling member 1 is also suitable for the filling of filling products of variable viscosity and/or mixed with additives, such as for example syrup, pulp, fruit pieces and the like.

The filling member 1 has a product channel 10 with the above-mentioned product outlet 11 via which the filling product to be filled flows into a container located thereunder. To this end, the filling product may be removed from a filling product reservoir (not shown in the figures) located downstream of the filling member 1 and/or flow into the product channel 10.

The filling member 1 also has a filling valve 20 which comprises a valve cone 21 and a valve seat 22 which at least in some sections is of complementary shape. The filling valve 20 further comprises an actuator, not shown in FIGS. 1 and 2, which may displace the valve cone 21 in an axial direction so that the valve cone 21 may be moved into the valve seat 22 for blocking the product channel 10 and/or product outlet 11, and thus for interrupting the flow rate, and out of the product channel and/or product outlet for opening the product channel 10 and/or product outlet 11.

The filling valve 20 may be designed as check valve so that it is possible to switch in a binary manner between a closed state and an open state. Alternatively, the filling valve 20 may be provided with a flow rate control so that in addition to the closed state a plurality of open states may be set with various volumetric flow rates. The control of the filling valve 20 may be carried out in this case in a discrete or continuous manner.

The aforementioned flow rate control, for example, may be implemented by the valve cone 21 having a cylindrical shape tapering toward the product outlet 11. The product channel 10, which has the shape of an annular channel in the region of the valve cone 21, is formed on the inner face at least in some sections by the outer peripheral surface of the valve cone 21. On the outside the annular gap is defined and/or formed by a valve housing 12. According to the present exemplary embodiment the valve cone 21 is designed to be displaceable in the axial direction, i.e. upwardly and downwardly. In this manner the annular gap at the product outlet 11 may be increased and reduced. The height adjustment of the valve cone 21 is carried out within a working range, i.e. between a fully open position and a closed position or a position of the minimum flow rate, generally in a stepless manner.

The filling member 1 also has an equipment portion 30 which is designed to provide the filling member 1, in particular the product outlet 11, with one or more equipment means. The equipment means are generally cup-like aids, tools, or the like which may be moved by the equipment portion 30 below the product outlet 11 in order to close the product outlet 11 fully or partially, to modify the product flow rate, to filter the product or the like.

In the present exemplary embodiment, two equipment means are provided, i.e. a screen device 31 and a CIP cup device 32.

The term "CIP" in this case stands for "cleaning in place", a cleaning method in which the filling member 1 does not have to be dismantled for cleaning but may be flushed and/or steamed with a cleaning medium in the installed state. For the sake of linguistic simplicity, the term "CIP" also encompasses herein so-called "sterilizing in place" (SIP), i.e. a sterilizing method in which the filling member 1 in a similar manner does not have to be dismantled for sterilization but may be flushed through and/or steamed with a sterilizing medium in the installed state.

The equipment portion 30 is designed to pivot the screen device 31 and the CIP cup device 32 as required and typically independently of one another. In order words, the screen device 31 and the CIP cup device 32 are moved by a pivoting movement into their respective working position, in which they are correspondingly located below the product outlet 11, and out of the working position.

It should be mentioned that alternatively or additionally a translational movement or a movement along any other trajectory may be carried out, as long as the equipment means may be moved into its respective working position and out of this position without a manual intervention being required or without the filling member 1 having to be partially or fully dismantled for the installation and/or removal of the equipment means.

According to the embodiment of FIGS. 1 and 2, the screen device 31 has a pivoting arm 31a which is held on a pivoting shaft 33a of a pivoting device 33 of the equipment portion 30 and which is pivotable about said pivoting shaft or an axis of the pivoting shaft 33a, as well as a screen cup 31b which is provided at the other end of the pivoting arm 31a.

The pivoting arm 31a and/or the screen cup 31b are generally produced from plastics or stainless steel. The pivoting arm 31a and the screen cup 31b may be configured in multiple pieces or in one piece.

The screen cup 31b comprises a screen 31c (see FIG. 2) which is designed as a filter, in order to collect particles above a specific size, namely dirt, metal cuttings and the like, and to prevent these particles from passing into the container to be filled. To this end, the screen 31c has a plurality of openings, the size and arrangement thereof determining the filtering action.

The openings of the screen 31c may be introduced, for example, into a suitable material by means of a laser, whereby the screen 31c may be produced in a simple manner integrally and/or in one piece.

Relative thereto it should be mentioned that the screen cup 31b, including the screen 31c, may be lasered directly into the pivoting arm 31a, whereby the production of the screen device 31 may be carried out in a manner which is particularly simple and resource-saving.

Alternatively the screen 31c may be produced by 3D printing, sintering or in a different manner. The screen 31c may alternatively be configured in the manner of mesh or netting. In some embodiments, the screen 31c is held and/or stabilized by a stabilizing portion 31d which in the present exemplary embodiment is of annular configuration.

The opening diameter of the screen 31c may range from 0.4 to 0.8 mm which is suitable, for example, for filling water. For filling oils, opening diameters in the region of 0.05 mm are suitable. The screen 31c is thus also able to filter out microplastics in addition to larger foreign particles.

Similarly, the CIP cup portion 32 has a pivoting arm 32a which is also held on a pivoting shaft 33b and which is pivotable about said pivoting shaft or an axis of the pivoting shaft 33b. The pivoting shafts 33a and 33b may be identical or independent components. Thus the pivoting shafts 33a and 33b, for example, may be arranged concentrically to one another and may be actuatable independently of one another.

The CIP cup portion 32 also has a CIP cup 32b which is provided relative to the pivoting shaft 33b at the other end of the pivoting arm 32a.

The pivoting arms 32a and/or the CIP cup 32b are generally produced from plastics or stainless steel. The pivoting arm 32a and CIP cup 32b may be configured in multiple pieces or in one piece.

The CIP cup 32b is designed to close the product outlet 11 during the implementation of a cleaning and/or sterilizing of the filling member 1. The CIP cup 32b may be designed to close the product outlet 11 in a fluid-tight manner.

Alternatively, the CIP cup 32b may have an opening and/or may be provided with a drain in order to discharge the cleaning and/or sterilizing fluid. The CIP cup 32b may also be designed as a steam cup in order to permit a sterilization of product-guiding components by means of superheated steam or the like.

For the cleaning and/or sterilization a corresponding treatment medium is introduced into the filling member 1 via the channels which during production operation guide the filling product. Thus due to the positioned CIP cup 32b the treatment medium is not able to drain away via the product outlet 11 but may be discharged, for example, via a separate channel which, for example, branches off above the product outlet 11 or may even be provided on the CIP cup 32b.

The screen 31c may be designed to be interchangeable. In this case the interchangeability or replaceability does not necessarily serve only for cleaning, maintenance or for replacement in the case of damage but various filter characteristics may be implemented in this manner depending on the filling product and/or use. In this case, for example, the screen 31c may be designed to be interchangeable as a small modular unit and/or the screen cup 31b and/or the screen device 31 as larger modular units. One or more of these features for the interchangeability may be similarly provided for the CIP cup device 32.

Alternatively or additionally, a plurality of equipment means may be implemented as the screen device 31, whereby various filter characteristics may be implemented and set without modifying the filling member 1.

FIG. 1 shows a state in which both the screen cup 31b and the CIP cup 32b are located outside the working position, i.e.

are not arranged below the product outlet 11. This state is also denoted herein as the "normal state". In the normal state the filling product may flow into the container in free-flow and without further modification.

FIG. 2 shows a state in which the screen cup 31*b* is pivoted into the working position, i.e. the screen 31*c* is located below the product outlet 11 so that the filling product or a different liquid flows through the screen 31*c* and thus is filtered when it leaves the product outlet 11. This state is also denoted herein as the "screen state".

The screen cup 31*b*, in particular the annular stabilizing portion 31*d*, in the screen state may be in contact in a fluid-tight manner with a lower portion of the valve housing 12 in order to prevent liquid from escaping in an uncontrolled manner through a gap past the screen 31*c* and out of the filling member 1. The same applies to the CIP cup 32*b*.

In order to bring the equipment means, such as for example the screen cup 31*b* and/or the CIP cup 32*b*, into contact with the valve housing 12 of the filling member 1, the corresponding equipment means may be pressed against the filling member 1. To this end, the filling member 1 and/or the equipment means may be designed to be movable in a translational manner in the axial direction. In this case, the movement of the equipment into the working position thus encompasses a pivoting and a translational movement.

FIGS. 3A to 8B show a filling member 1 according to further exemplary embodiments in various states as sectional views, respectively from two lateral perspectives.

The designs of the filling members 1 according to the further exemplary embodiments are similar to the design of FIGS. 1 and 2, wherein the filling member 1 is shown with an exemplary actuator 40 which is designed to actuate the valve cone 21.

The actuator 40 may operate, for example, electromotively, magnetically, pneumatically or hydraulically. In the present examples, the actuator 40 has a media connection 41 via which a working medium, such as electricity, compressed air or the like, may be supplied in order to actuate the valve cone 21. Moreover, the actuator 40 has a spring 42, generally designed as a spiral spring, which serves to pretension the valve cone 21 into a working position, for example the blocking position or the fully open position.

The equipment portion 30 also has an actuator 34 which is designed to move the equipment means, i.e. in the present case the screen cup 31*b* and/or the CIP cup 32*b*, into the corresponding working position and out of said working position. The actuator 34 may comprise an electric motor in order to pivot the equipment means via the pivoting device 33. The actuator 34 may also comprise a lifting actuator which is implemented, for example, electromotively, magnetically, pneumatically or hydraulically, in order to carry out the above-mentioned possible lifting movement of the equipment means and/or the filling member 1 (more specifically at least the valve housing 12 thereof) relative to the equipment portion 30.

Figure 3A:
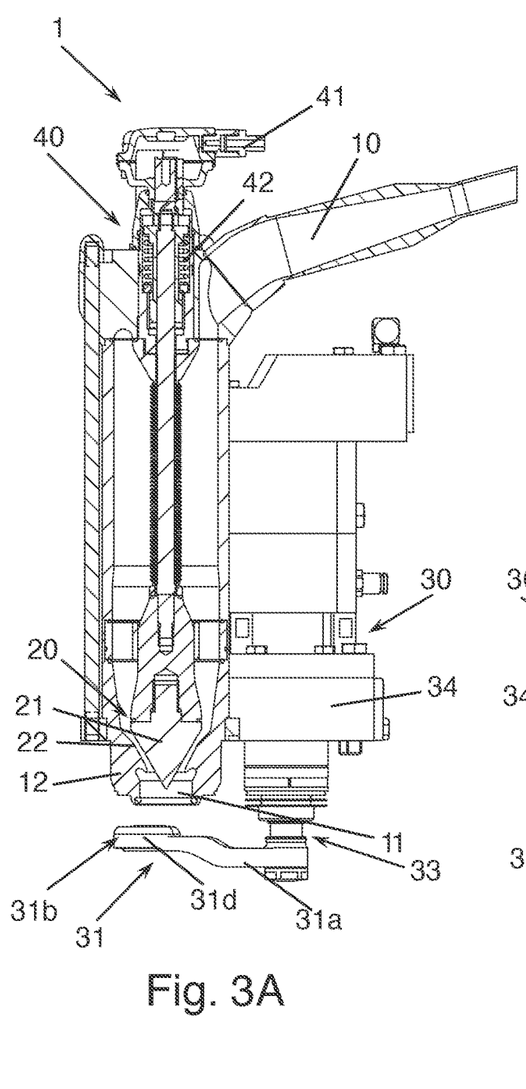
FIGS. 3A and 3B show a schematic sectional view of a filling member from two lateral perspective views according to a further exemplary embodiment in the normal state.
Figure 3B:
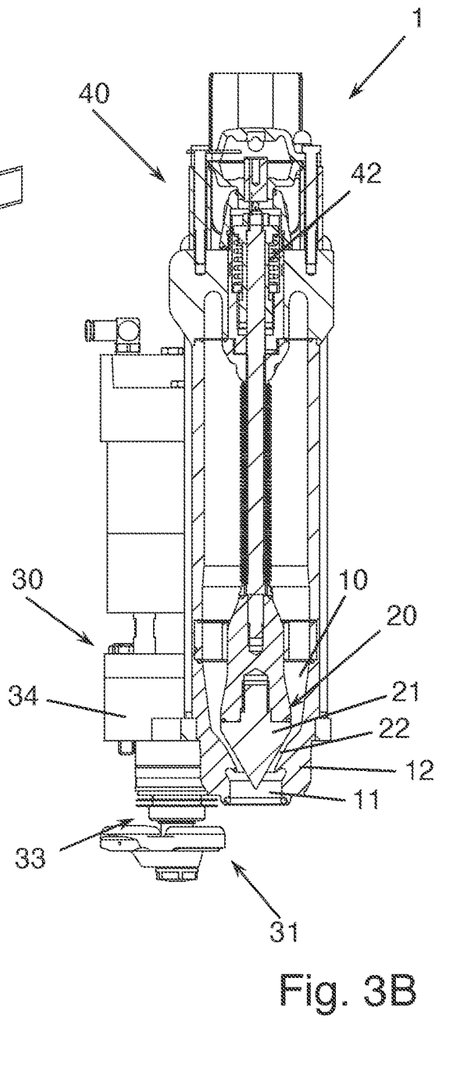

FIGS. 3A and 3B show a filling member 1 with a screen device 31 as equipment means in the normal state, in which the screen cup 31*b* of the screen device 31 is located outside the working position.

Figure 4A:
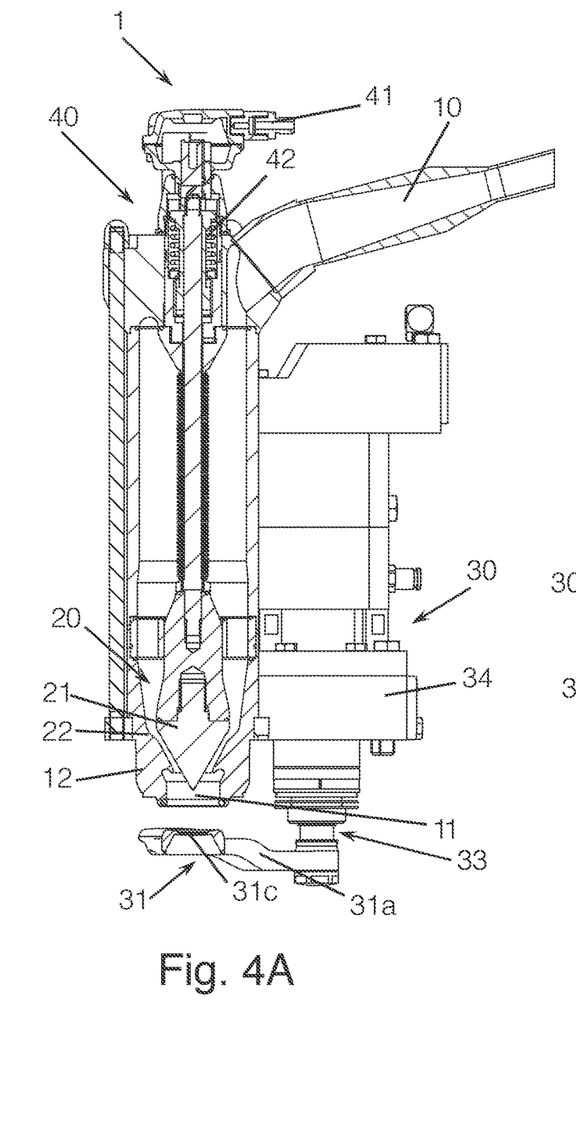
FIGS. 4A and 4B show schematic sectional views of a filling member from two lateral perspective views according to the exemplary embodiment of FIGS. 3A and 3B with the pivoted-in screen.
Figure 4B:
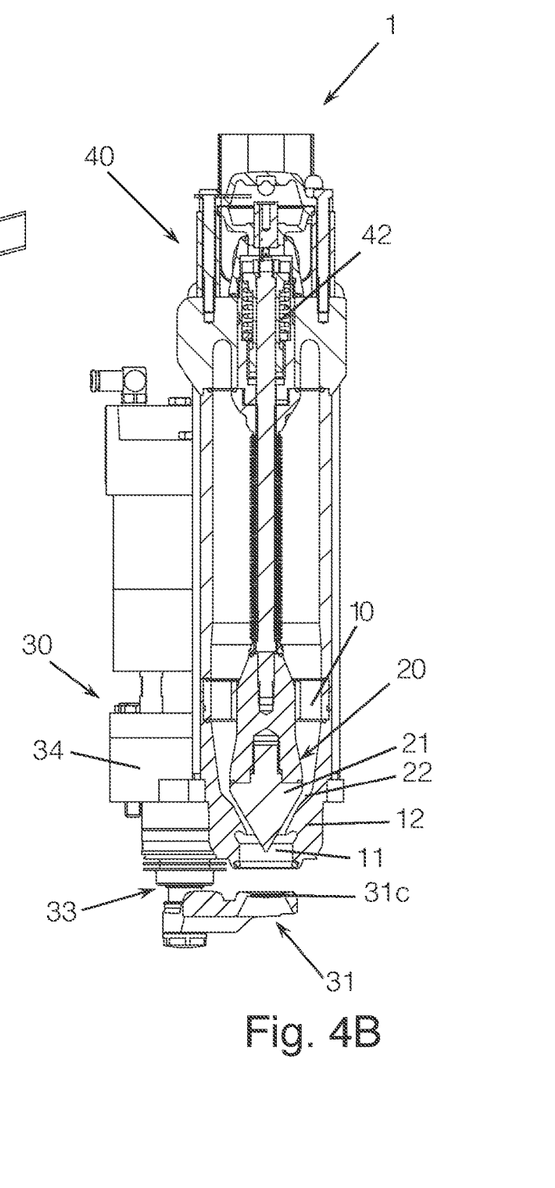

FIGS. 4A and 4B show the filling member 1 according to the exemplary embodiment of FIGS. 3A and 3B in a state in which the screen cup 31*b* is pivoted in, i.e. is located below the product outlet 11.

Figure 5A:
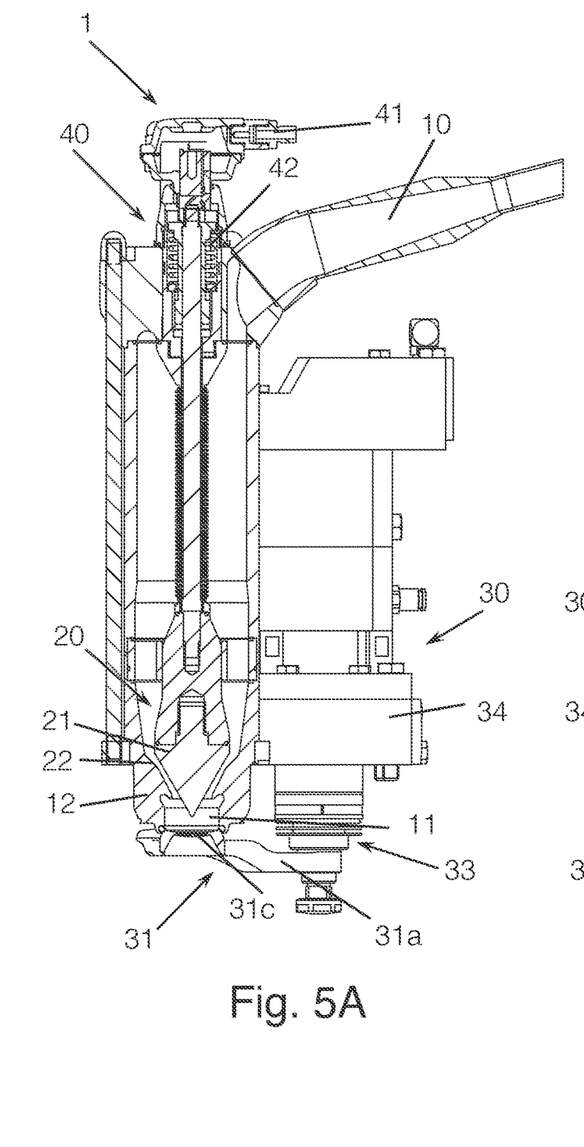
FIGS. 5A and 5B show schematic sectional views of a filling member from two lateral perspective views according to the exemplary embodiment of FIGS. 3A and 3B in the screen state.
Figure 5B:
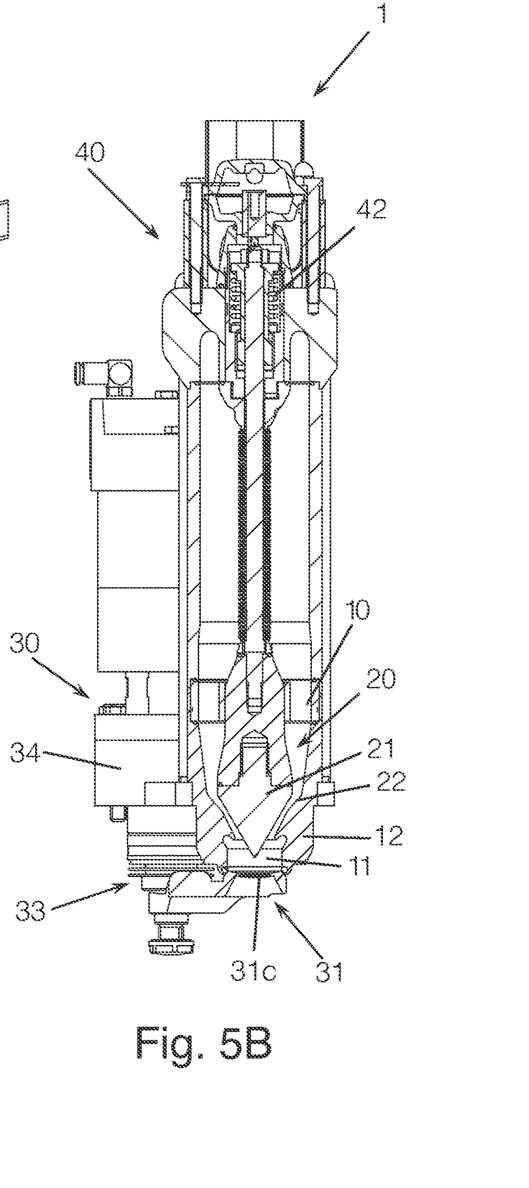

FIGS. 5A and 5B show the filling member 1 according to the exemplary embodiment of FIGS. 3A and 3B in the screen state, in which the screen cup 31*b* is pressed against the valve housing 12 in the working position.

Figure 6A:
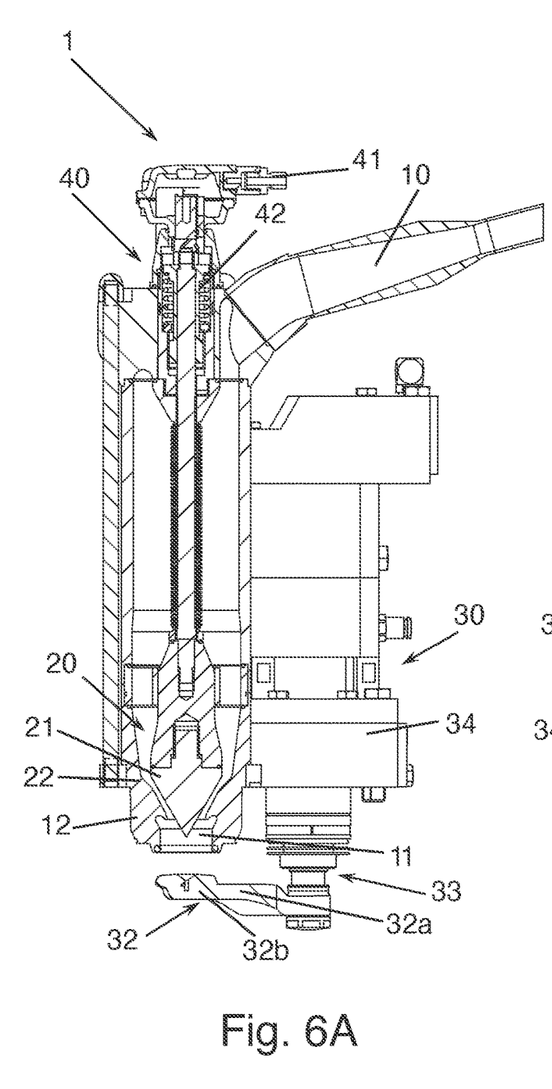
FIGS. 6A and 6B show schematic sectional views of a filling member from two lateral perspective views according to a further exemplary embodiment with the pivoted-in CIP cup.
Figure 6B:
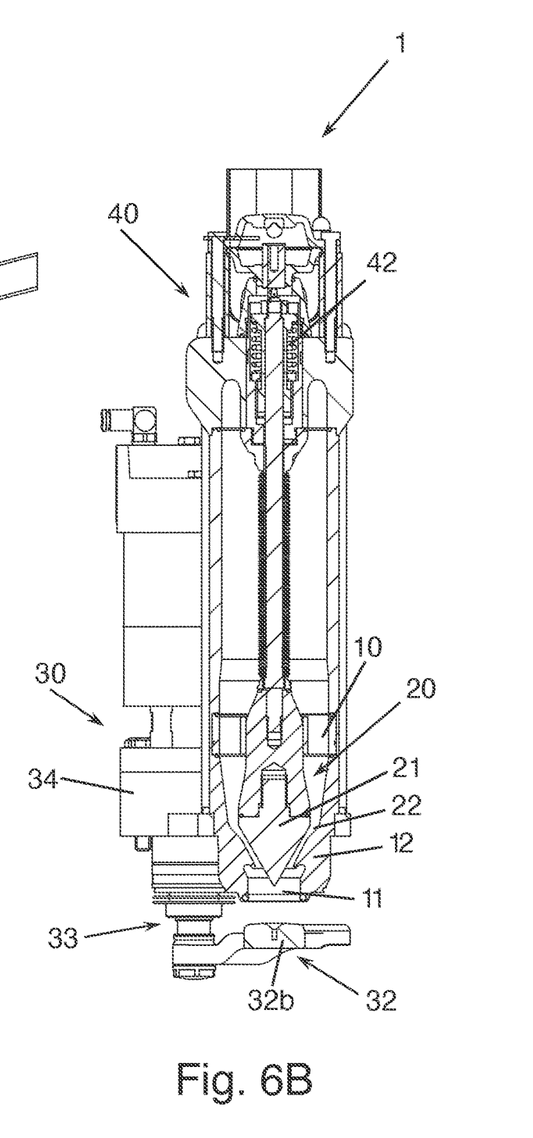

FIGS. 6A and 6B show a filling member 1 with a CIP cup device 32 as equipment means in a state in which the CIP cup 32*b* is pivoted-in, i.e. is located below the product outlet 11.

Figure 7A:
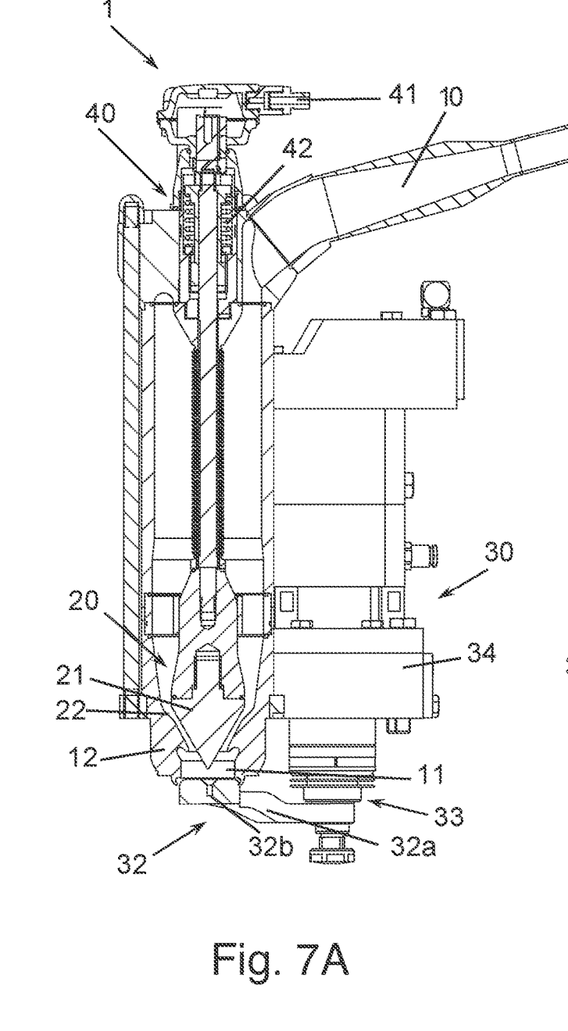
FIGS. 7A and 7B show schematic sectional views of a filling member from two lateral perspective views according to the exemplary embodiment of FIGS. 6A and 6B in the CIP state.
Figure 7B:
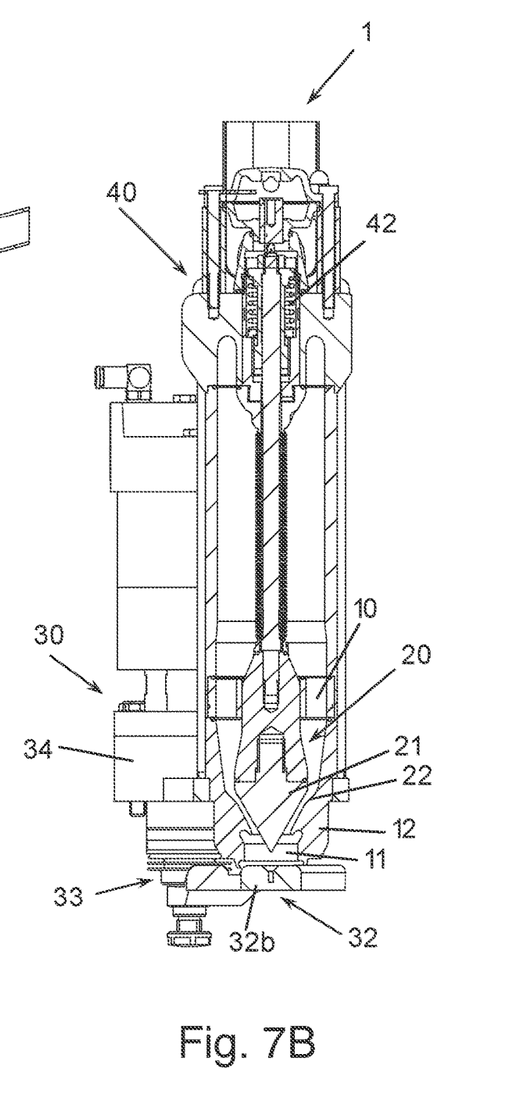

FIGS. 7A and 7B show the filling member 1 according to the exemplary embodiment of FIGS. 6A and 6B in a state, also denoted herein as the "CIP state", in which the CIP cup 32*b* is pressed against the valve housing 12 in the working position.

Figure 8A:
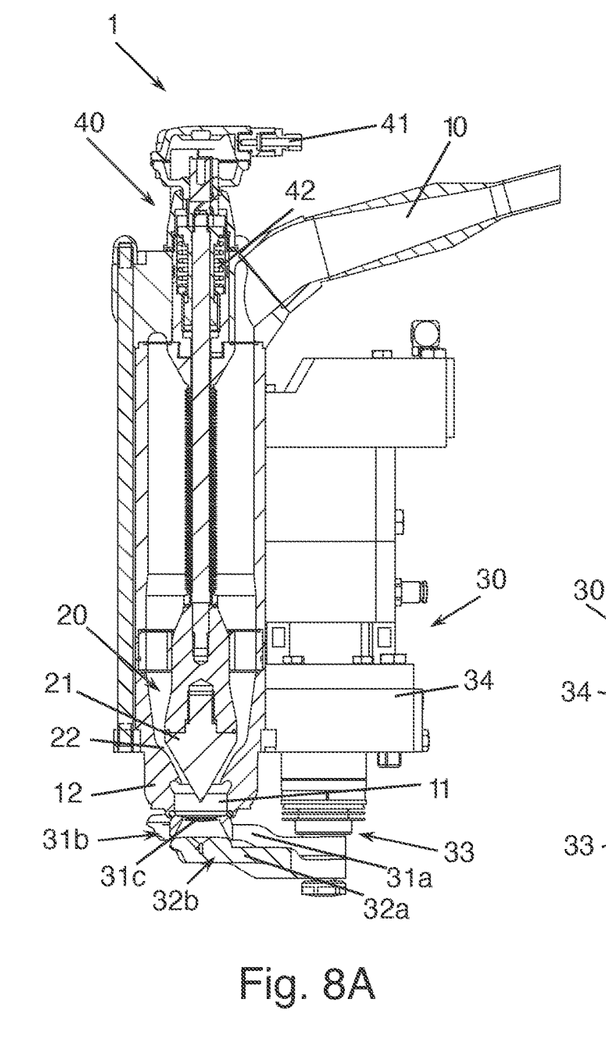
FIGS. 8A and 8B show schematic sectional views of a filling member from two lateral perspective views according to a further exemplary embodiment in a screen/CIP state.
Figure 8B:
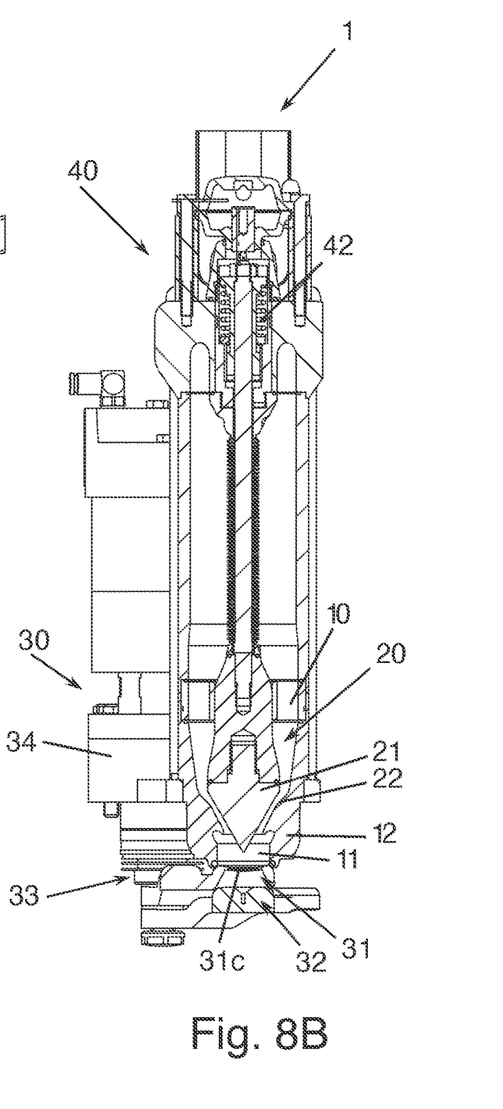

FIGS. 8A and 8B show a filling member 1 with a screen device 31 and a CIP cup device 32 in a state also denoted herein as the "screen/CIP state", in which both the screen cup 31*b* and the CIP cup 32*b* are in the working position. In this combined state, the screen cup 31*b* is pressed against the valve housing 12 whilst the CIP cup 32*b* is pressed directly thereunder against the screen cup 31*b*.

Although, in the exemplary embodiments set forth above, in the case of a plurality of equipment means said equipment means are pivotable independently of one another, a plurality of equipment means may be attached to a single pivoting shaft 33*a* or 33*b*. Thus, for example, a plurality of screen devices 31*a* may be attached to the pivoting shaft 33*a* and alternatively or additionally a plurality of screen cups 31*b* may be attached to the pivoting arm 31*a* so that said screen cups may be "selected in turn" in the manner of a magazine. This applies in a similar manner to any other equipment means, such as for example the CIP cup device 32. Various equipment means may also be attached to one and the same pivoting shaft.

The filling members 1 described herein permit a particularly variable operation, in particular in the case of free-flow filling. Clear products, such as for example water, may be filled when the screen 31*c* is moved in, whereby any contamination of the filled product by foreign particles may be prevented or at least reduced. The screen 31*c* functions in this case as a final barrier for particles or foreign bodies. Viscous filling products or products with fibres and/or fruit pieces, for example, may be filled without a screen 31*c*, whereby the filling member 1 is able to be used in a highly flexible manner. The filling curve may be optionally adapted when the screen 31*c* is moved in.

The screen 31*c* may also improve the drip behaviour, by the openings and/or mesh of the screen 31*c* being dimensioned and arranged such that uncontrolled dripping, for example of liquid which adheres to the lower region of the valve cone 21, is prevented or at least reduced.

For cleaning the screen 31*c*, the screen may be acted upon from below by a cleaning jet from a corresponding nozzle in the moved-in or moved-out state, and thus sprayed out from below.

The equipment portion 30 may additionally be used synergistically for the flexible use of one or more further equipment means, such as the CIP cup 32*b*. As a possible variant, this results in a combined use of both equipment means so that, for example, various possibilities may be implemented for the cleaning and/or sterilization of the filling member 1 with or without the screen 31*c*.

If applicable, all of the individual features which are disclosed in the exemplary embodiments may be combined with one another and/or replaced without departing from the scope of the invention.

The invention claimed is:

1. A filling member for filling a container with a filling product, comprising:
    a product outlet configured to dispense the filling product into the container located thereunder; and an equipment portion comprising a first screen device with a first screen, wherein:
  the first screen device comprises a pivoting arm that is held on a pivoting shaft of the equipment portion and is pivotable thereby,
  the first screen comprises a mesh and/or a plurality of openings,
  the equipment portion is configured to transfer the first screen into (1) a screen state, in which the first screen is located between the product outlet and the container so that the filling product is filtered by the first screen when introduced into the container, and (2) an out of screen state in which the first screen is not located between the product outlet and the container, and
  movement of the first screen device into the screen state and the out of screen state comprises a pivoting movement.

2. The filling member of claim 1, wherein the first screen device further comprises a screen cup comprising the first screen, and the equipment portion is further configured to press the screen cup in the screen state against a housing portion of the filling member such that the screen cup surrounds the product outlet to prevent the filling product from escaping past the first screen and out of the product outlet.

3. The filling member of claim 1, wherein the filling member is configured for free-flow filling.

4. The filling member of claim 1, further comprising:
  a product channel that is fluidically connected to the product outlet;
  a filling valve with a valve cone arranged in the product channel;
  a valve seat that is of a complementary shape at least in some sections to the valve cone; and
  an actuator that is configured to displace the valve cone in an axial direction of the product outlet so that the valve cone is enabled to move into the valve seat for blocking the product outlet and to move out of the valve seat for opening the product outlet.

5. The filling member of claim 1, wherein the equipment portion further comprises a tool, and the equipment portion is configured to transfer the tool into a state below the product outlet and out of the state below the product outlet.

6. The filling member of claim 5, wherein the tool comprises a second screen device with a second screen, and filter characteristics of the second screen are different from filter characteristics of the first screen.

7. The filling member of claim 5, wherein the tool comprises a cleaning in place (CIP) cup device having a CIP cup, and the equipment portion is further configured to transfer the CIP cup (1) into a CIP state in which the CIP cup closes the product outlet, and (2) out of the CIP state in which the CIP cup does not close the product outlet.

8. The filling member of claim 7, wherein movement of the CIP cup device into and out of the CIP state comprises a pivoting movement, and the CIP cup device comprises a pivoting arm that is held on a pivoting shaft of the equipment portion and is pivotable thereby.

9. The filling member of claim 7, wherein movement of the CIP cup device into and out of the CIP state comprises a translational movement.

10. The filling member of claim 9, wherein the translational movement comprises an axial direction of the product outlet.

11. The filling member of claim 7, wherein the equipment portion is further configured to transfer the first screen and the CIP cup (1) into a screen/CIP state in which both the first screen and the CIP cup are located below the product outlet, and (2) out of the screen/CIP state in which both the first screen and the CIP cup are not located below the product outlet.

12. The filling member of claim 11, wherein the first screen device comprises a screen cup comprising the first screen, and the equipment portion is further configured such that in the screen/CIP state, the screen cup is pressed against a valve housing of the filling member while the CIP cup is pressed directly thereunder against the screen cup.

13. The filling member of claim 1, wherein the first screen is configured to be interchangeable.

14. The filling member of claim 1, wherein the first screen is configured as one piece with the first screen device.

15. A filling member for filling a container with a filling product, comprising:
  a product outlet configured to dispense the filling product into the container located thereunder; and
  an equipment portion comprising:
  a first screen device with a first screen, wherein the equipment portion is configured to transfer the first screen into (1) a screen state in which the first screen is located between the product outlet and the container so that the filling product is filtered by the first screen when introduced into the container, and (2) an out of screen state in which the first screen is not located between the product outlet and the container,
  a second screen device with a second screen, wherein the equipment portion is further configured to transfer the second screen into (1) a screen state in which the second screen is located between the product outlet and the container so that the filling product is filtered by the second screen when introduced into the container, and (2) an out of screen state in which the second screen is not located between the product outlet and the container, and
  a cleaning in place (CIP) cup device having a CIP cup, wherein the equipment portion is further configured to transfer the CIP cup (1) into a CIP state in which the CIP cup closes the product outlet and (2) out of the CIP state in which the CIP cup does not close the product outlet.

16. The filling member of claim 15, further comprising:
  a product channel that is fluidically connected to the product outlet;
  a filling valve with a valve cone arranged in the product channel;
  a valve seat that is of a complementary shape at least in some sections to the valve cone; and
  an actuator that is configured to displace the valve cone in an axial direction of the product outlet so that the valve cone is enabled to move into the valve seat for blocking the product outlet and enabled to move out of the valve seat for opening the product outlet.

17. The filling member of claim 15, wherein the equipment portion is further configured to transfer the first screen and the CIP cup (1) into a screen/CIP state in which both the first screen and the CIP cup are located below the product outlet and (2) out of the screen/CIP state in which both the first screen and the CIP cup are not located below the product outlet.

18. The filling member of claim 15, wherein movement of the first screen device into the screen state and the out of screen state comprises a pivoting movement, and the first screen device comprises a pivoting arm that is held on a pivoting shaft of the equipment portion and is pivotable thereby.

19. The filling member of claim 15, wherein movement of the first screen device into the screen state and the out of screen state comprises a translational movement.

20. The filling member of claim 19, wherein the translational movement comprises an axial direction of the product outlet.

* * * * *